United States Patent [19]

Taguchi et al.

[11] Patent Number: 5,110,391
[45] Date of Patent: May 5, 1992

[54] METHOD AND APPARATUS FOR AUTOMATICALLY BONDING FILM TO A SUBSTRATE AND CUTTING THE FILM TO DESIRED SIZE

[75] Inventors: Hiroshi Taguchi, Tokyo; Youji Washizaki, Saitama, both of Japan

[73] Assignee: Somar Corporation, Tokyo, Japan

[21] Appl. No.: 557,036

[22] Filed: Jul. 25, 1990

[30] Foreign Application Priority Data

Dec. 31, 1989 [JP] Japan .................................. 1-341300

[51] Int. Cl.⁵ ............................................. B32B 31/18
[52] U.S. Cl. ..................................... 156/250; 156/521; 156/522; 156/552; 83/305
[58] Field of Search .............. 156/250, 510, 521, 522, 156/552, 555; 83/305

[56] References Cited

U.S. PATENT DOCUMENTS

| | | | |
|---|---|---|---|
| 4,323,416 | 4/1982 | Malthouse et al. | 156/521 |
| 4,743,325 | 5/1988 | Miyake | 156/552 |
| 4,844,772 | 7/1989 | Sumi et al. | 156/552 |
| 4,888,083 | 12/1989 | Sumi et al. | 156/522 |
| 4,961,803 | 10/1990 | Hamamura et al. | 156/522 |
| 4,964,937 | 10/1990 | Seki | 156/552 |
| 4,986,873 | 1/1991 | Hamamura | 156/552 |

*Primary Examiner*—Caleb Weston
*Attorney, Agent, or Firm*—Sughrue, Mion, Zinn, Macpeak & Seas

[57] ABSTRACT

An apparatus for bonding a thin film to the surface of a substrate wherein the film is supplied from a continuous roll to a bonding position where a roller applies heat and pressure to cause the film to be bonded to the substrate. A rotary cutter rapidly cuts the continuous film to a length which fits precisely over the substrate. The cutter comprises a stationary knife and a rotary knife which are disposed on opposite sides of the continuous film. The knives are moveable between a cutting position and a non cutting position and are adjustable to provide in the cutting position a rapid cut of the film transversed to the direction of film travel. The apparatus is operative to hold the leading edge of the film, direct the leading edge to a bonding position at the leading edge of the substrate, hold the film in tension as the film is pressure bonded to the substrate and further hold the film in tension for cutting to its appropriate length.

6 Claims, 11 Drawing Sheets

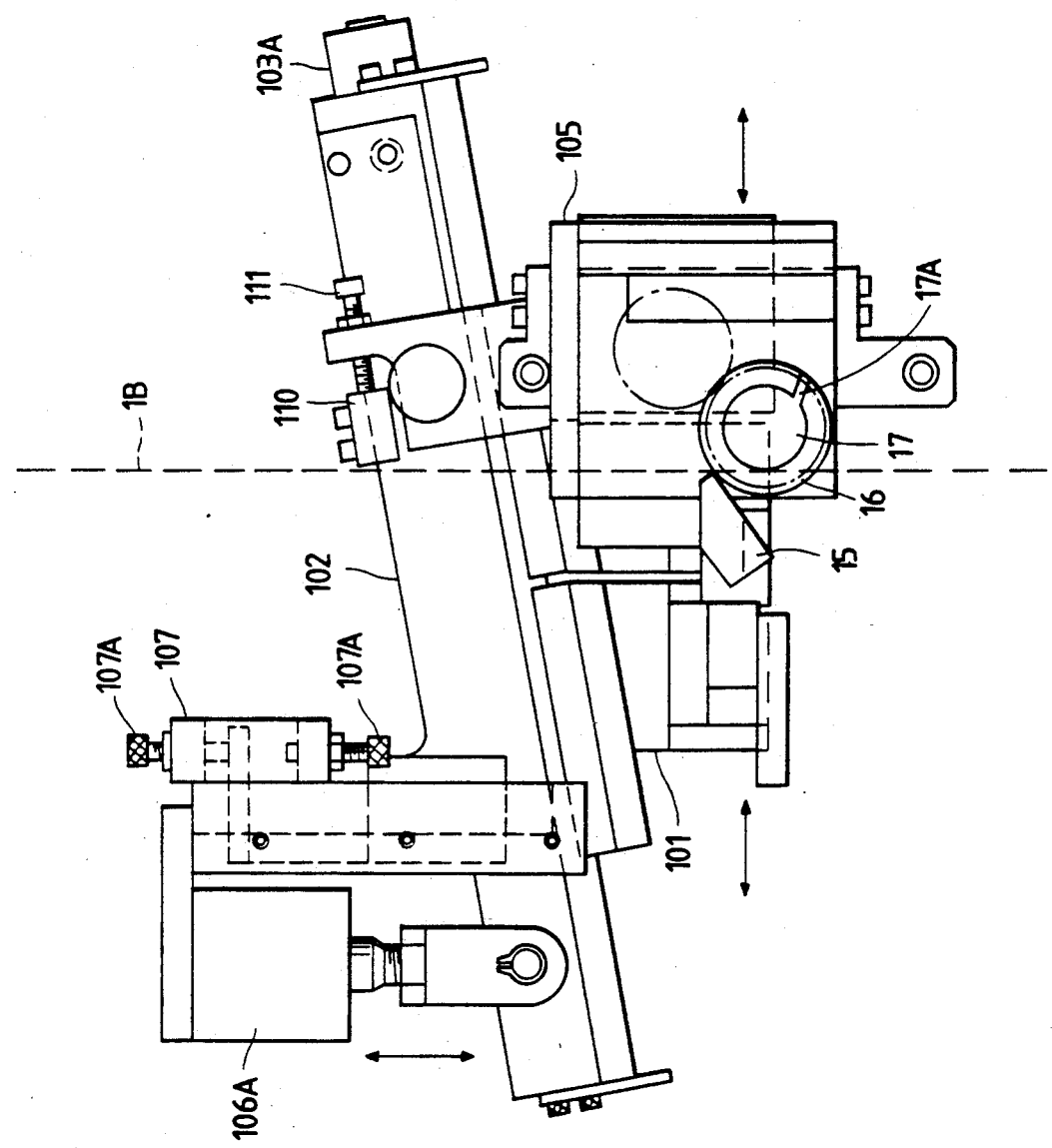

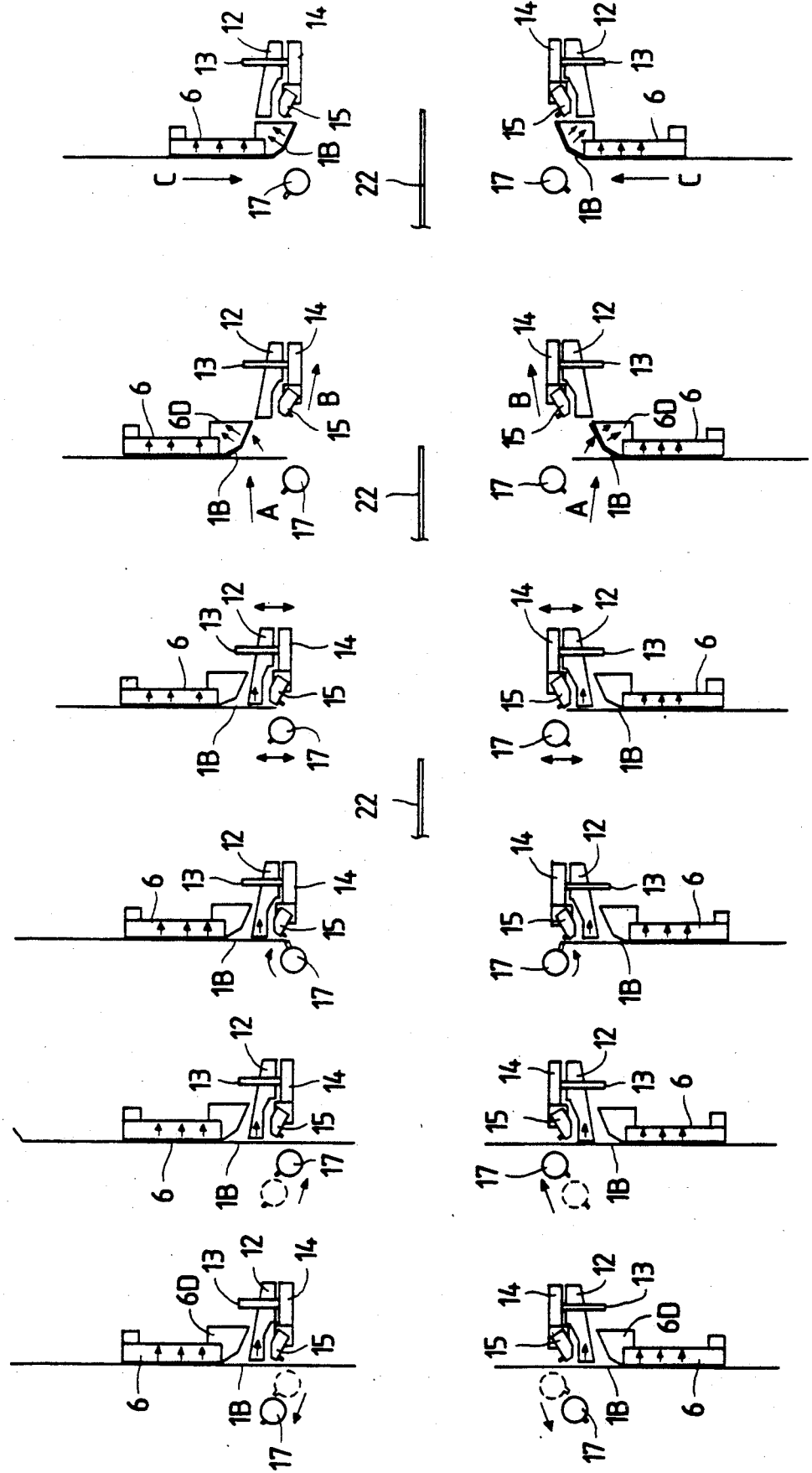

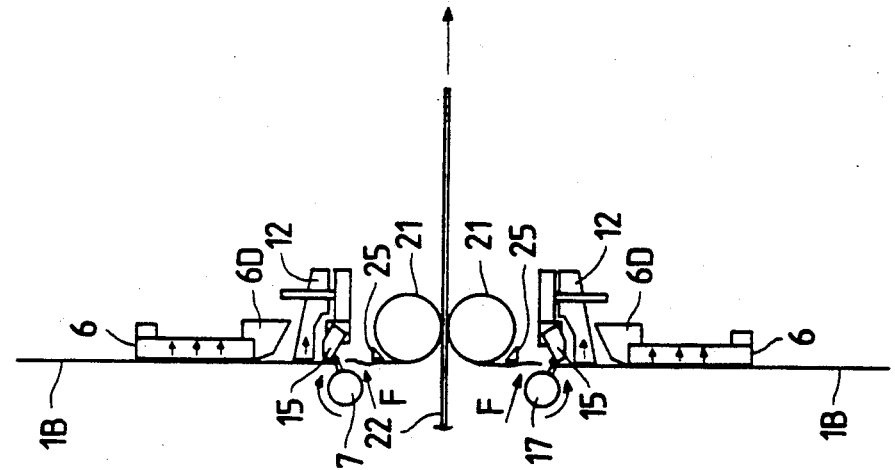
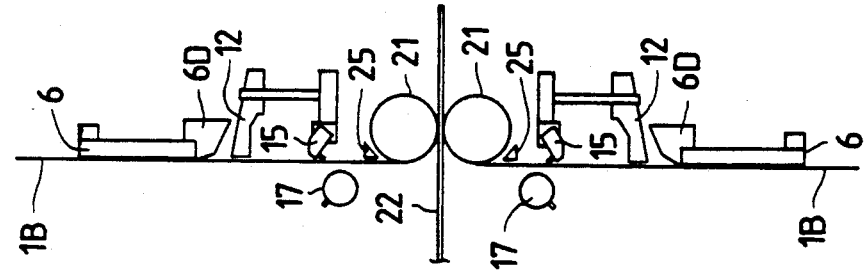
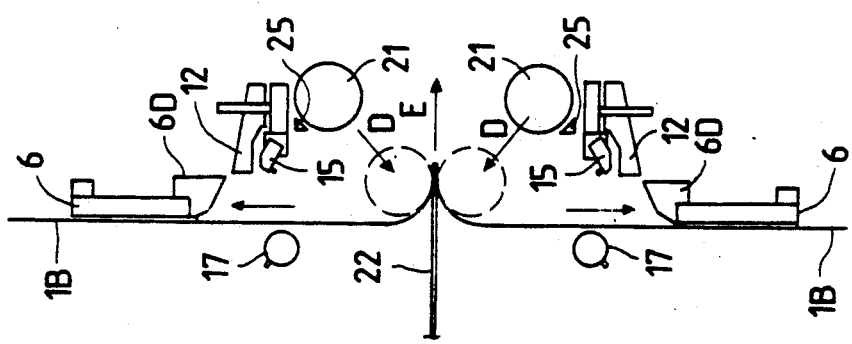
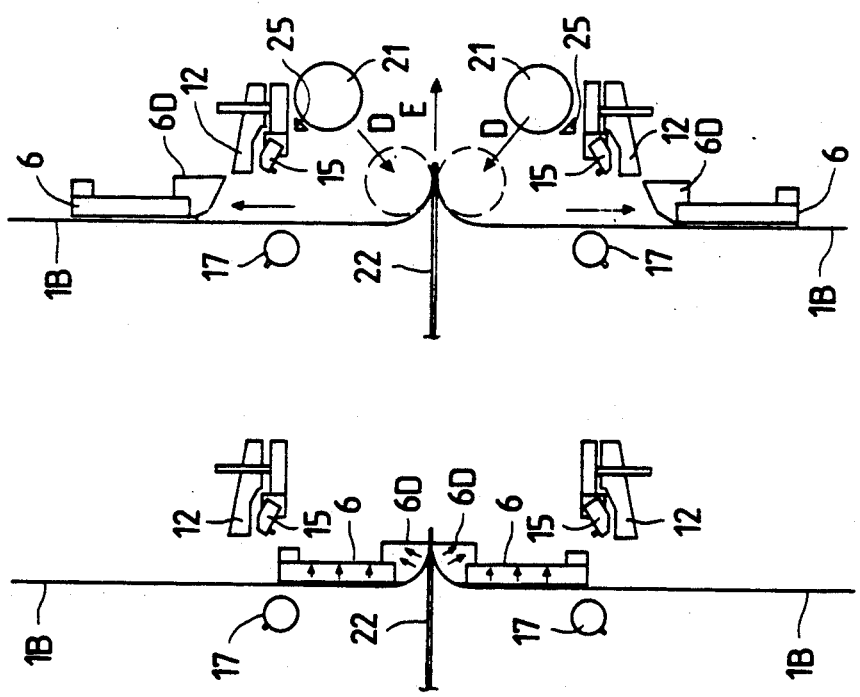

METHOD AND APPARATUS FOR AUTOMATICALLY BONDING FILM TO A SUBSTRATE AND CUTTING THE FILM TO DESIRED SIZE

BACKGROUND OF THE INVENTION

1. Field of the Invention

The present invention relates to a method and apparatus for bonding a film to a substrate. The present invention particularly relates to the bonding of a laminated film consisting of a photosensitive resin layer and a light-transmissible resin film, under pressure, to a base plate for a printed circuit board.

2. Description of the Background Art

When a continuous laminated film is bonded to a base plate for a printed circuit board by a conventional apparatus, the film must be cut to a length corresponding to that of the base plate. The cutting operation is conducted as the base plate is being conveyed by a roller conveyor or the like. The cutoff of the film is performed by a moving cutoff unit which forms a part of the conventional apparatus. The cutoff unit has a rotary cutting disk which is drawn reciprocally across the width of the film.

The laminated film being continuously fed onto the surface of the base plate, as the plate is being moved, should be cut exactly perpendicularly to the longitudinal direction of the film. To accomplish this, the rotary cutting disk of the moving cutoff unit of the conventional apparatus must be reciprocated very quickly. Since the width of the laminated film may exceed 820 mm, the rotary cutting disk must be moved by a length of about 900 mm. The speed of the cutoff unit is such that it takes a least about 0.7 second to move the cutoff unit across a film of 820 mm in width. For that reason, the speed of the feed of the laminated film can be only set at about 4 m/min. or less. This low speed is undesirable in a high speed manufacturing operation. Furthermore, the quick movement and stoppage of the rotary cutting disk will impart strong forces on the guide members for the disk. These forces tend to stress the guides and make the maintenance cost of the apparatus high.

Accordingly, it is an object of the present invention to provide a method in which a continuously fed film, having a large width, may be accurately and quickly cut off perpendicularly to the direction of the feed of the film by a rotary disk cutter, without causing undesired droop of the film, and then bonded to a substrate.

It is another object of the present invention to provide an apparatus by which the continuously fed film, having a large width, may accurately and quickly cut off perpendicularly to the direction of the feed of the film through the use of the rotary cutter, without causing undesired droop of the film, and then bonded to the substrate.

It is yet another object of the present invention to provide a technique for cutting off a portion of a continuous film in such a manner as to prevent strong forces from being imparted to a guide member for the cutter.

The above-mentioned and other objects of the present invention and the novel features thereof will be apparent from the description herein and the drawings attached hereto.

SUMMARY OF THE INVENTION

In the method provided in accordance with the present invention, the film whose length corresponds to that of the substrate is bonded to the film bonding surface of the substrate by a pressure bonding roller. The method comprises a step in which the leading edge of the continuous film is cut off perpendicularly to the direction of the feed of the film in preparation for bonding for the first time; a step in which the leading edge of the continuous film is sucked on the tip of a film feed member; a step in which the film feed member is moved to the vicinity of the leading edge of the film bonding surface of the substrate conveyed to a film bonding position, so that the leading edge of the continuous film is fed to the substrate; a step in which the leading edge of the continuous film is bonded to that of the film bonding surface of the substrate in the film bonding position; a step in which the suction of the continuous film on the feed member is ceased, the feed member is moved away from the film bonding surface of the base plate, and the continuous film is bonded further, under pressure, to the film bonding surface of the substrate gradually from the leading edge of the film by the pressure bonding roller while the film is fed further by the roller; a step in which the fed film is sucked while the speed of the feed of the film and that of the movement of the feed member are caused to correspond to each other; a step in which the continuous film is cut off, by the rotary cutter, perpendicularly to the direction of the feed of the film without droop, so that the cut-off film has a trailing edge and the length of the cut-off film corresponds to that of the substrate; and a step in which the trailing edge of the cut-off film is bonded to that of the film bonding surface of the substrate by the pressure bonding roller.

Therefore, the fed film, having a large width, can be accurately and quickly cut off perpendicularly to the direction of the feed of the film without causing undesired droop of the film, and then the cut-off film can be bonded to the substrate. In addition, the continuous film, having a large width, can be accurately and quickly cut off between the rotary knife and the stationary knife only by one rotation of the rotary knife.

Further, the step in which the leading edge portion of the continuous film is cut off perpendicularly to the direction of the feed of the film in preparation for bonding for the first time may be executed by using the rotary cutter while keeping the film at a standstill and keeping the cutter in the state of extending perpendicularly across the direction of the feed of the film.

Therefore, the leading edge of the continuous film can be cut off perpendicularly to the direction of the feed of the film.

Also, the step in which the continuous film is cut off, by the rotary cutter, perpendicularly to the direction of the feed of the film, without droop, so that the cut-off film has the trailing edge and the length of the cut-off film corresponds to that of the substrate may be executed by using the cutter set in the state of extending obliquely across the direction of the feed of the film, at a prescribed angle thereto depending on the speed of the feed of the film and the circumferential velocity of the rotary knife of the cutter.

Therefore, the trailing edge of the continuous film can be cut off perpendicularly to the direction of the feed of the film without causing any undesired droop of the film, the length of the cut-off film corresponding to that of the substrate.

As for the apparatus provided in accordance with the present invention, the film whose length corresponds to that of the substrate is bonded to the film bonding surface of the substrate by the pressure bonding roller. The apparatus is characterized in that a substrate conveyance mechanism for conveying the substrate to a film bonding position and conveying the substrate out from the position is provided. A film feed member is included, which sucks the continuous film at the leading edge thereof on the feed member itself and feeds the leading edge of the film to the film bonding position, and is provided on a support member so that the feed member can be moved in the direction of film feeding. The support member is provided on the body of the apparatus so that the support member can be moved in the direction of film feeding. A film holding member, which has a holding surface capable of being put in surface contact with the film at the leading edge thereof after the feeding of the film to the film bonding position by the feed member and includes film suction means provided in the holding surface and connected to an air pressure reduction system so as to suck the film at the leading edge thereof on the holding surface to curve the film onto the feed member, is provided on the support member so that the holding member can be moved toward and away from one side of the film. The stationary knife of the rotary cutter is attached to the body of the apparatus so that the stationary knife can be moved toward and away from the one side of the film and moved away. The holding member is coupled to the stationary knife so that the holding member can be moved toward the rear side of the film and moved backward. The rotary knife of the rotary cutter is attached to the body of the apparatus so that the rotary knife can be moved toward and away from the other side of the film and moved away. A rotary cutter moving means for placing each of the stationary knife and the rotary knife either in such a position so as to extend perpendicularly across the fed film or in such a position so as to extend obliquely across the fed film is provided. The pressure bonding roller is also provided to bond the film, from the leading edge thereof to the trailing edge thereof, to the film bonding surface of the substrate from the leading edge of the surface to the trailing edge thereof after the leading edge of the film is held in the film bonding position by the film feed member.

In the apparatus, the substrate is conveyed to the film bonding position by the substrate conveyance mechanism. The film bonding member is moved to a very close position of the film feeding path from apart position of the one side of the film, and the leading edge of the continuous film is cut off perpendicularly to the direction of the feed of the film in preparation for bonding for the first time. The leading edge of the continuous film is placed at the leading edge of the film feed member and sucked. The leading edge of the continuous film is fed to the leading edge portion of the film bonding surface of the substrate being conveyed to the film bonding position by moving the film feed member close to the film bonding surface, and temporarily bonded to the film bonding position. Then, the suction of the film feed member is loosened and the film feed member is moved away from the film bonding surface of the substrate. The film is fed and successively bonded to the substrate from the leading edge of the film by the pressure bonding roller. The fed film is sucked under the condition that feeding speed of the film is synchronized with moving speed of the film feed member. The trailing edge of the continuous film is cut off perpendicularly to the direction of the feed of the film, by the rotary cutter disposed obliquely, without causing undesired droop of the film. The length of the cut-off film corresponds to that of the substrate. The trailing edge of the cut-off film is bonded to the trailing edge portion of the film bonding surface of the substrate by the pressure bonding roller. Therefore, the fed film, having a large width, can be accurately and quickly cut off perpendicularly to the direction of the feed of the film without causing undesired droop of the film, and then the cut-off film can be bonded to the substrate.

In the apparatus, the rotary knife of the rotary cutter may be rotatably supported at both the ends thereof by sliding members which can be moved toward and away, relative to the film, on a rotary cutter support member attached to the body of the apparatus, and the stationary knife of the rotary cutter may be provided near the film holding member.

Therefore, the distance between the stationary and the rotary knives can be made large, in preparation for cutting off the continuous film for the first time, so that it is easy to lay the fed film through the knives.

BRIEF DESCRIPTION OF THE DRAWINGS

FIGS. 4A and 4B are views of the rotary cutter seen in directions L1 and L2 shown in FIG. 3, respectively;

FIGS. 10, 11, 12, 13, 14, 15, 16, 17, 18 and 19 are views for explaining the bonding of the film to the base plate.

In the embodiments of the present invention, hereafter described in detail with reference to the drawings, identical structures are identified by the same reference symbols.

DESCRIPTION OF THE PREFERRED EMBODIMENTS

Figure 1:
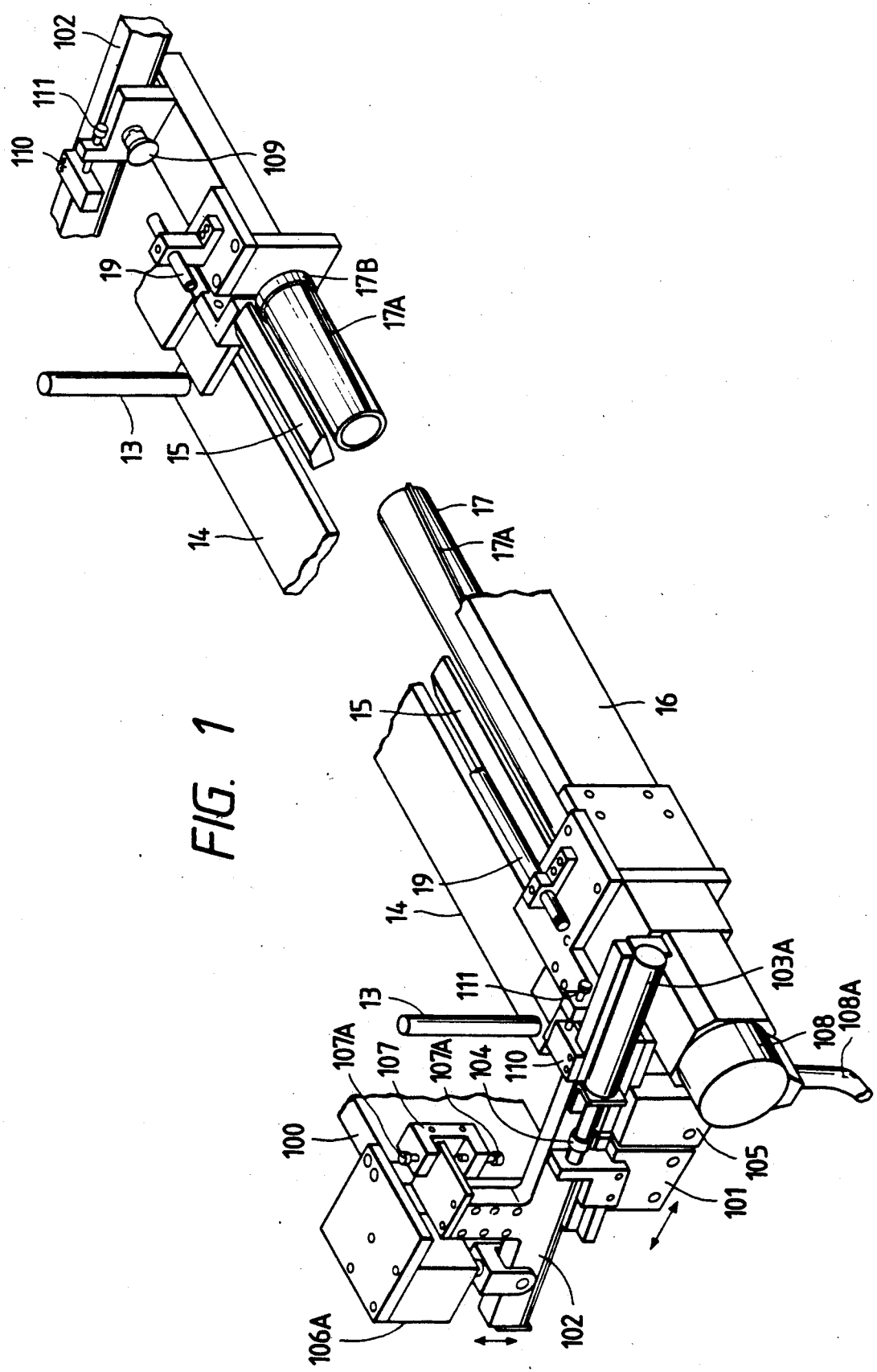
FIG. 1 is a perspective view of the rotary cutter of an apparatus which is an embodiment of the present invention and by which laminated films, each of which consists of a photosensitive resin layer and a light-transmissible resin film, are bounded to the obverse and reverse sides of a base plate for a printed circuit board, respectively.
Figure 2:
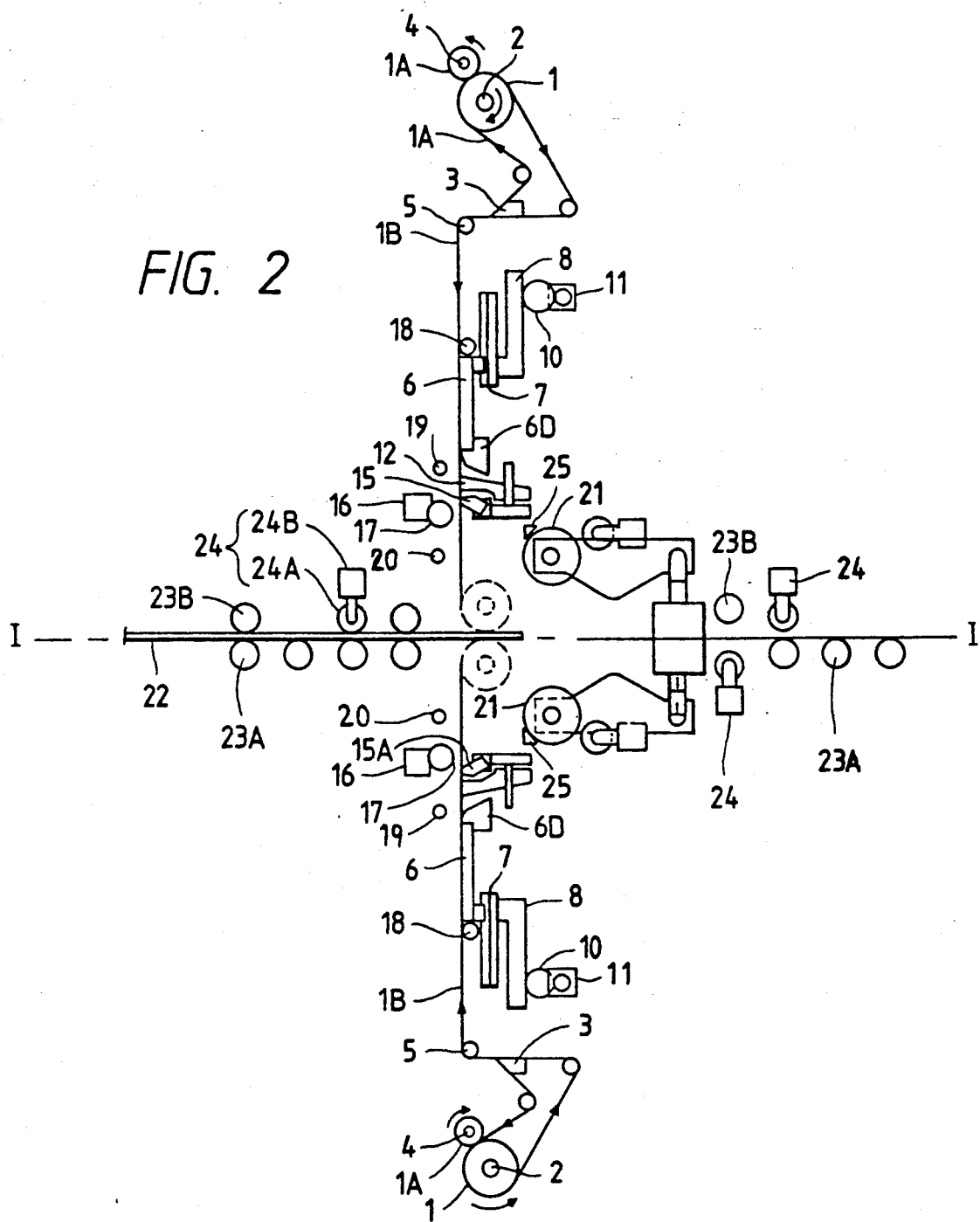
FIG. 2 is a schematic view of the apparatus.
Figure 3:
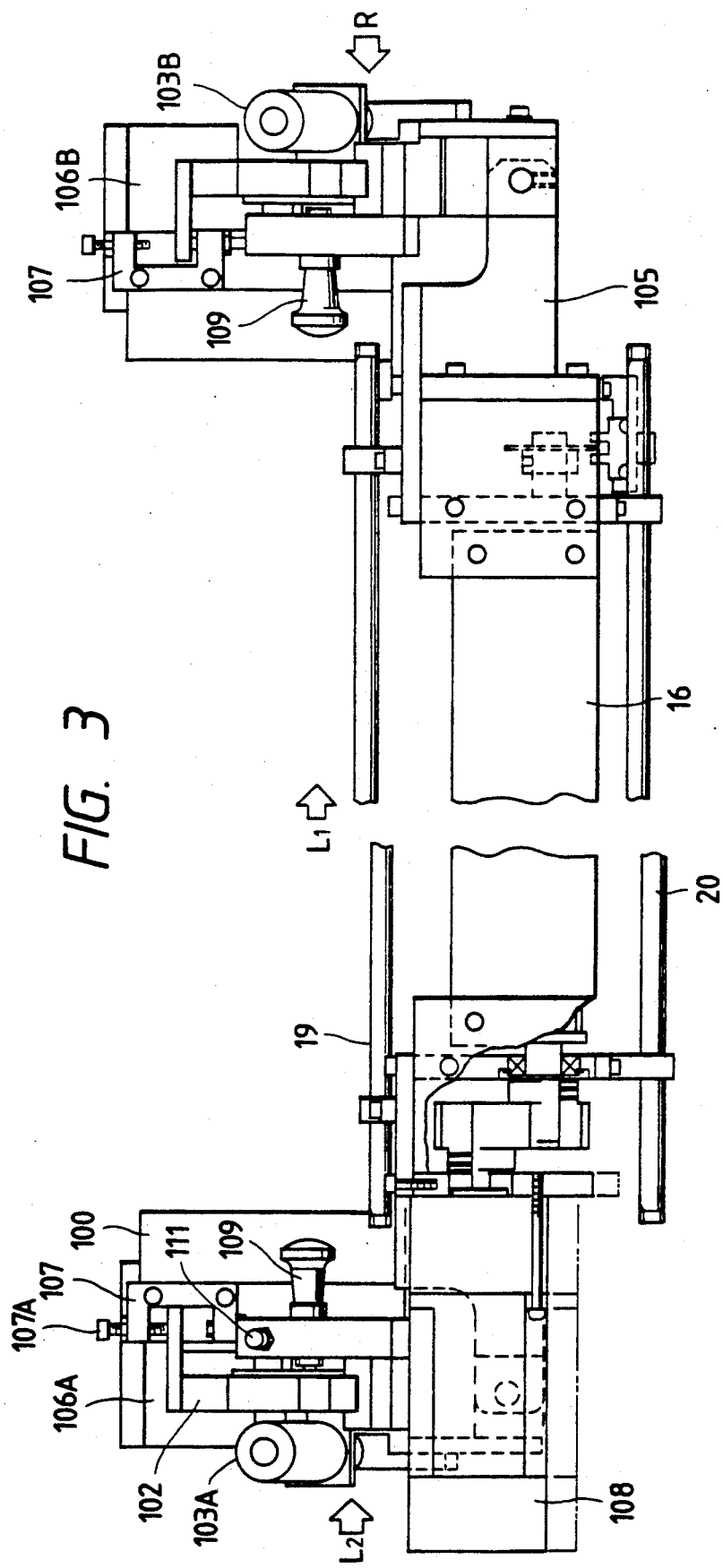
FIG. 3 is a front view of the rotary cutter.
Figure 4B:
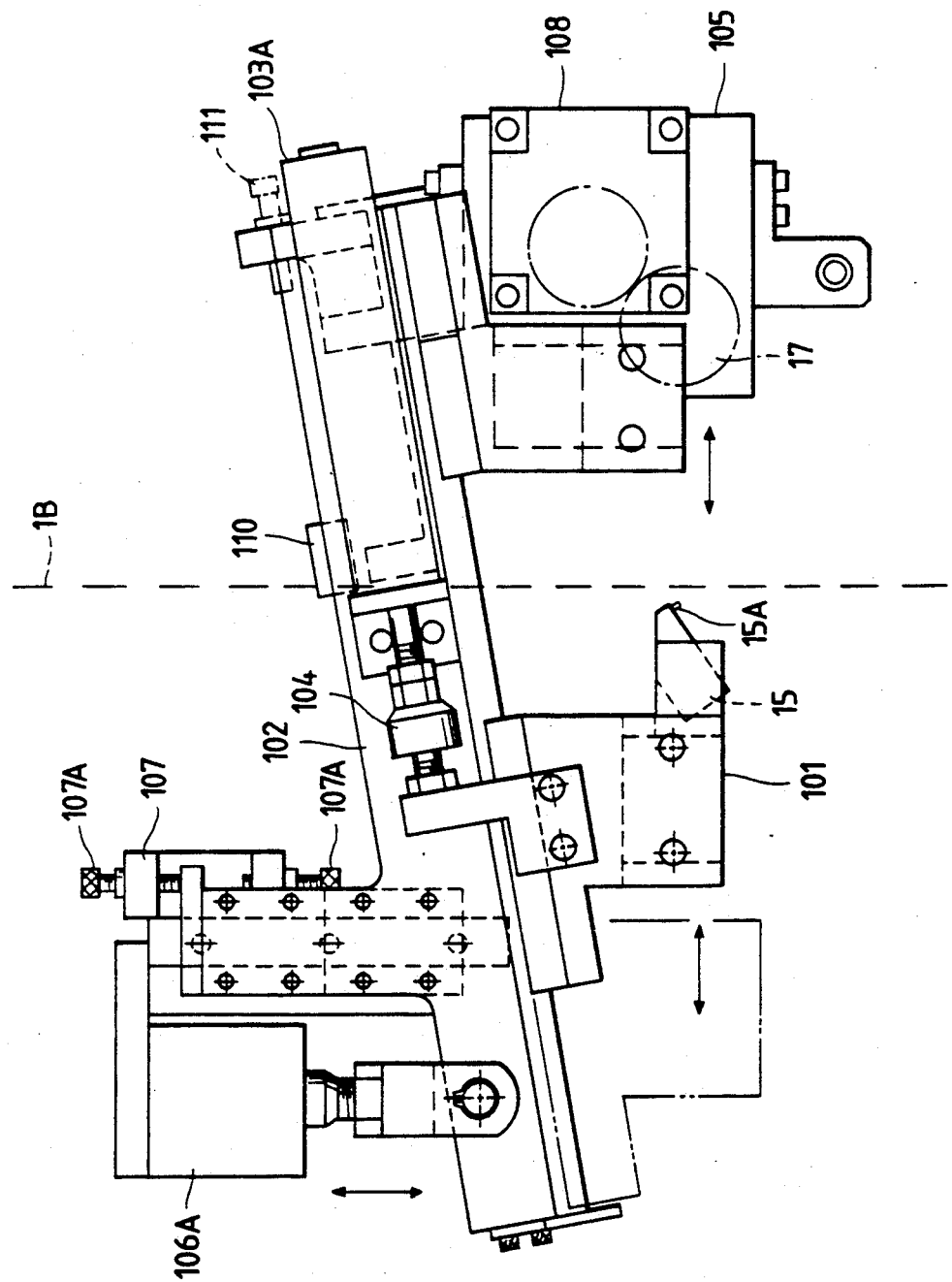
Figure 5:
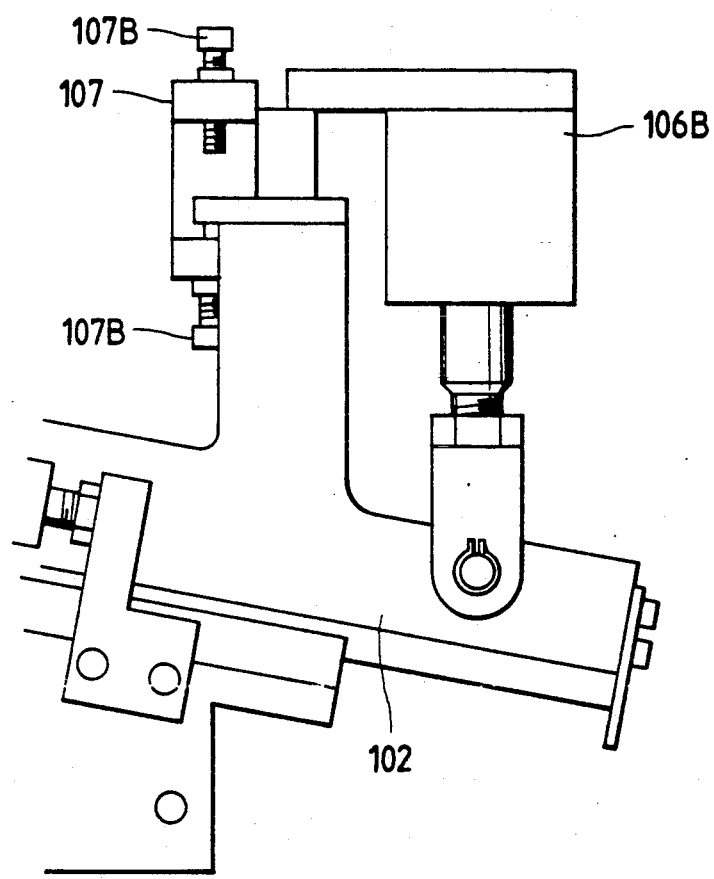
FIG. 5 is a view of the rotary cutter seen in a direction R shown in FIG. 3.
Figure 6:
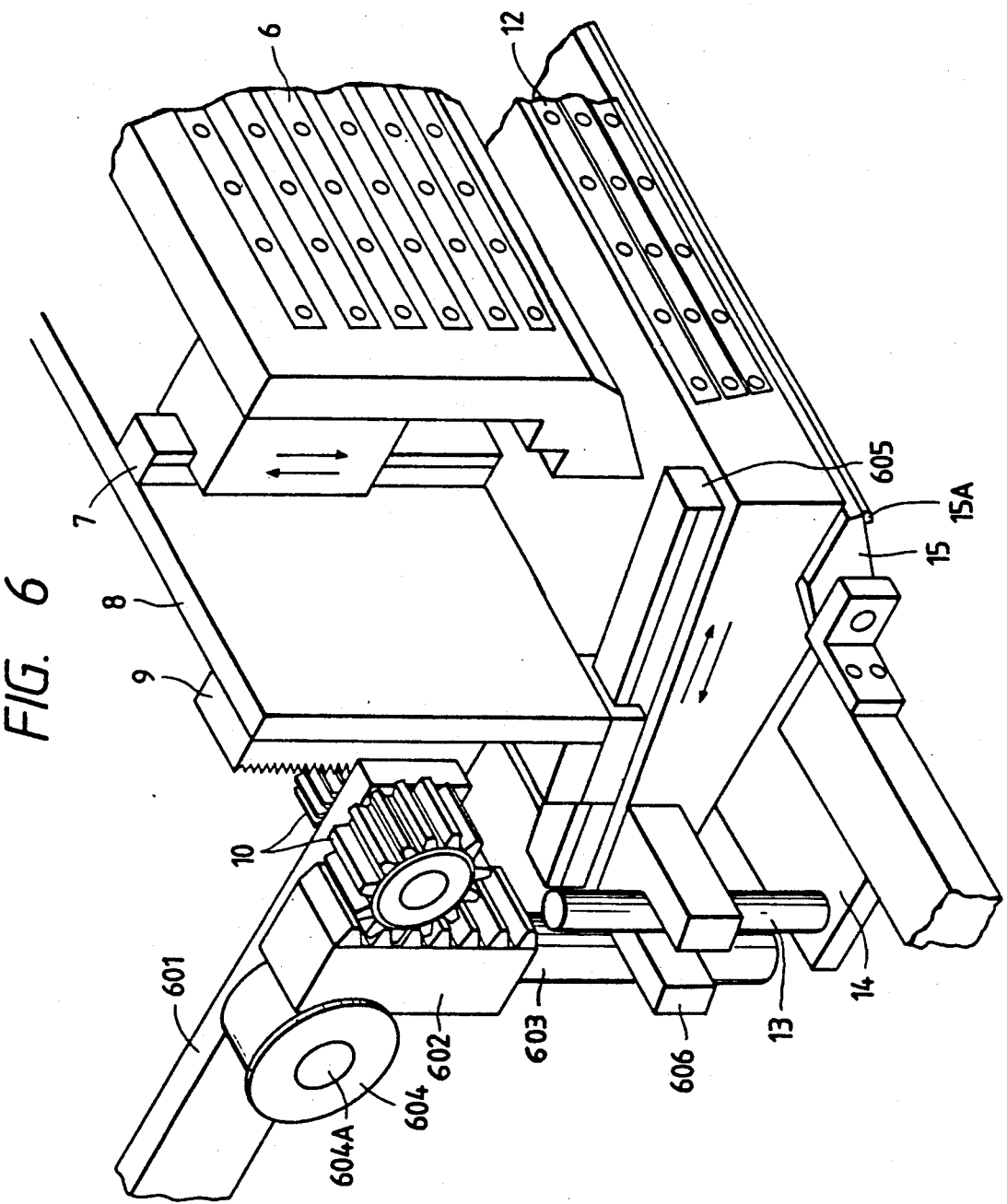
FIG. 6 is an enlarged perspective view of the main vacuum suction plate and film holding member of the apparatus and the stationary knife of the rotary cutter.
Figure 7:
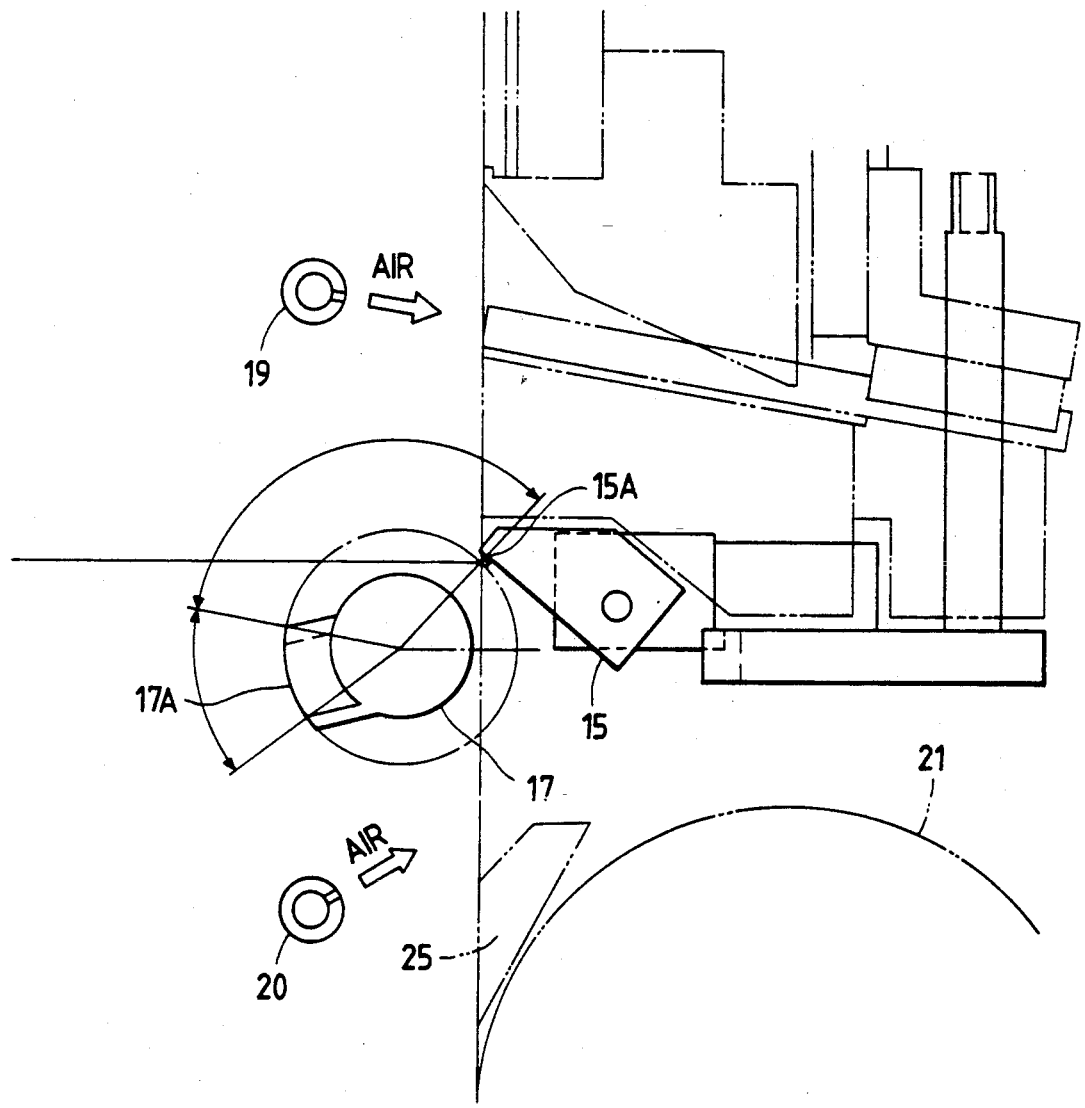
FIG. 7 is a view for explaining the positional relationship between the stationary and rotary knives of the rotary cutter.

FIG. 1 is a perspective view of the rotary cutter of an apparatus which is one of the embodiments of the present invention. In the apparatus, laminated films, each of which consists of a photosensitive resin layer and a light-transmissible resin film, are bonded under heat and pressure, to the opposite planar sides of a base plate for a printed circuit board. FIG. 2 is a schematic view of the apparatus. FIG. 3 is a front view of the rotary cutter. FIGS. 4A and 4B are views of the rotary cutter seen in directions L1 and L2 shown in FIG. 3, respectively. FIG. 5 is a view of the rotary cutter seen in a direction R shown in FIG. 3. FIG. 6 is an enlarged perspective view of the main vacuum suction plate and film holding member of the apparatus and the stationary knife of the rotary cutter. FIG. 7 is a view for explaining the positional relationship between the stationary and rotary knives of the rotary cutter. In FIG. 2, initially, films 1, each consisting of a light-transmissible resin film, the photosensitive resin layer and another light-transmissible resin film, are available as a laminate continuously wound on supply rollers 2. Each film 1 provided from the supply roller 2 is divided, by a film separator 3, into the light-transmissible resin film 1A, which is a protective film, and the laminated film 1B. The laminated film 1B comprises the other light-transmissible resin film and the photosensitive resin layer, whose surface to be bonded to the base plate is uncovered as a result of the division. The light-transmissible resin film 1A is wound on winding rollers 4. The supply rollers 2 and the winding rollers 4 are positioned over and under a base plate conveyance passage I—I, as shown in FIG. 2. The film separator 3 has an effective length that corresponds to a maximum width of films to be used. The separator 3 has a separating tip end in the form of a wedge in cross section. For this reason, it is possible to reduce a separation resistance of the transparent resin film 1A. In addition, there is no undesired displacement in the film separation point. It is possible to readily and smoothly separate the laminated film 1B and the transparent film 1A from each other.

The leading edge of each laminated film 1B is sent to a main vacuum suction plate (i.e., film feed member) 6 via a tension roller 5. A static electricity remover 18 is provided close to the main vacuum plate 6 for removing static electricity of the laminated film 1B. As seen in FIG. 6, each main vacuum suction plate 6 is vertically movable toward and away from a film bonding position proximate to the conveyance passage I—I. For this purpose, plate 6 is slidably fitted to a respective guide rail 7 attached to a support plate 8 which itself is mounted on a mounting frame 601 secured to the body of the apparatus. Support plate 8 can be moved up and down through a rack 9 and a pinion 10 engaged with a rack 602 provided on a vertically moving rod 603 coupled to a motor 11. The rack 602 can be moved up and down by a pressure roller 604 whose rotary shaft 604A is fitted to the mounting frame 601. The film holding member 12 is slidably fitted to the guide rails 605 extending in the front-to-rear direction of the apparatus and coupled to the support plate 8 for the main vacuum suction plate 6. The film holding member 12 is provided with notched couplers 606 fitted with coupling rods 13 and attached to a support member 14 for supporting a stationary knife 15 of the rotary cutter, as shown in FIG. 1 and 6.

As seen in FIG. 1, with further detail provided in FIGS. 3, 4A, 4B and 5, the support member 14 is attached to sliding members 101 which are for sliding the support member and are slidably fitted to rotary cutter support members 102 so that the sliding members are moved backward and forward by pneumatic cylinders 103A and 103B. A member 104 for adjusting the position of the stationary knife 15 of the rotary cutter is provided in a prescribed position at the piston rod of the pneumatic cylinder 103A. Sliding members 105 for sliding a support member 16 for supporting the rotary knife 17 of the rotary cutter are slidably fitted to the rotary cutter support members 102 so that the sliding members are manually moved backward and forward. A rotary cutter angle adjuster, which is made of pneumatic cylinders 106A and 106B and their associated structures, is secured to the mounting frame 100 of the body of the apparatus at one end of each of the rotary cutter support members 102. Members 107 for setting the angle of the rotary cutter in a horizontal or inclined position are secured to the mounting frame 100 at the rotary cutter support members 102 near the rotary cutter angle adjuster. Pins 107A for adjusting the angle of the rotary cutter in the horizontal or inclined position are provided.

The support member 16 for supporting the rotary knife 17 is coupled to the sliding member 105 which is for sliding the support member. The rotary knife 17 is rotatably supported by the support member 16. The rotary knife 17 has a blade 17A extending from the body of the knife obliquely at a prescribed angle thereto. Brake rings 17B of the stationary knife 15 of the rotary cutter are provided on the rotary knife 17 at both the ends thereof. A servomotor 108 for rotating the rotary knife 17 by a prescribed angel is provided at one end of the support member 16. Engagement knobs 109 for positioning when the rotary cutter is in use or out of use are provided at both the ends of support member 16. The knobs 109 serve to position the sliding members 105 and lock them when the rotary cutter is in use or out of use. When the rotary cutter is out of use, as when the laminated film 1B is placed between the stationary and rotary knives 15 and 17 of the cutter for the first time, the engagement knobs 109 are manually pulled out to move the sliding members 105 to increase the distance between the stationary knife 15 and the sliding members and then pushed into fitting holes of the support members 102 to position and lock the sliding members. Air blowing pipes 19 and 20 for blowing air onto the laminated film 1B are provided over and under the support member 16. Stoppers 110 for positioning the sliding members 105 when the rotary knife 17 is to be put in use are provided on the support member 102. Positioning screws 111, which are stopped by the positioning stoppers 110, are provided on the sliding members 105 at both the ends thereof.

FIG. 7 shows the positional relationship between the stationary and rotary knives 15 and 17 of the rotary cutter. The stationary knife 15 is always urged by a spring, not shown in the drawings, so that the blade 15A of the knife is oriented toward the base plate conveyance passage I—I.

FIG. 2 illustrates heat and pressure bonding rollers 21, the base plate 22 for the printed circuit board, driving rollers 23A, idle rollers 23B, base plate hold-down units 24, and vacuum suction bars 25. Each of the base plate hold-down units 24 comprises a base plate hold-down roller 24A and a pneumatic cylinder 24B for moving the roller up and down.

When a base plate leading edge position detecting sensor, which is provided near the base plate conveyance passage I—I but not shown in the drawings, detects that the base plate 22 has been conveyed to a position where the film 1B is initially bonded to the base plate, a detection signal is sent out from the sensor so that the rotation of the driving rollers 23A is stopped. At the same time, the rotation of the base plate hold-down roller 24A of he upstream base plate hold-down unit 24 is also stopped. Immediately after the leading edge of the base plate 22 has passed under the base plate hold-down roller 24A, the pneumatic cylinder 24B is put into action on the basis of the detection signal so that the base plate is held down. The movement of the base plate 22 is thus surely stopped by the roller 24A so that even if the leading end portion 6D of the main vacuum suction plate 6 comes into contact with the base plate 22, the base plate does not move. In this position, the film 1B an be carried and initially bonded at an edge to the base plate 11. The base plate 22 is held down by the roller 24A until the heat and pressure bonding roller 21 comes into contact with the base plate. As soon as the roller 21 comes into contact with the base plate 22, in preparation for movement across the surface of the plate to bond the film thereto, the pneumatic cylinder 24B is put out of action.

Figure 8:
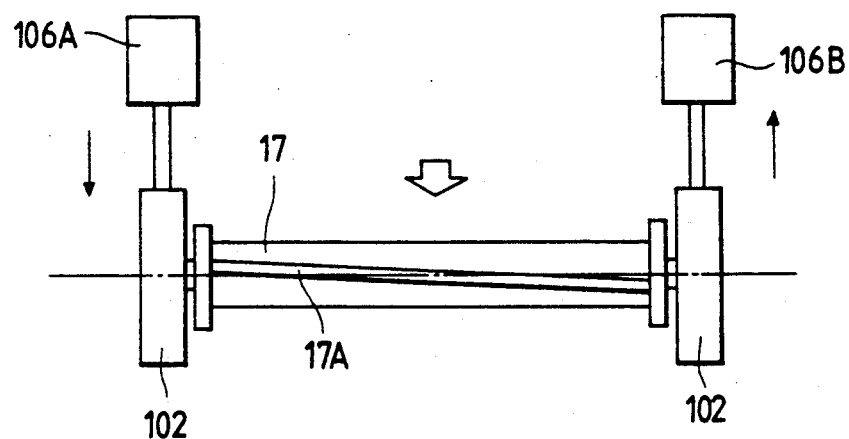
FIG. 8 is a view for explaining a means for setting the stationary and the rotary knives so that they extend perpendicularly across the direction of the feed of the film.
Figure 9:
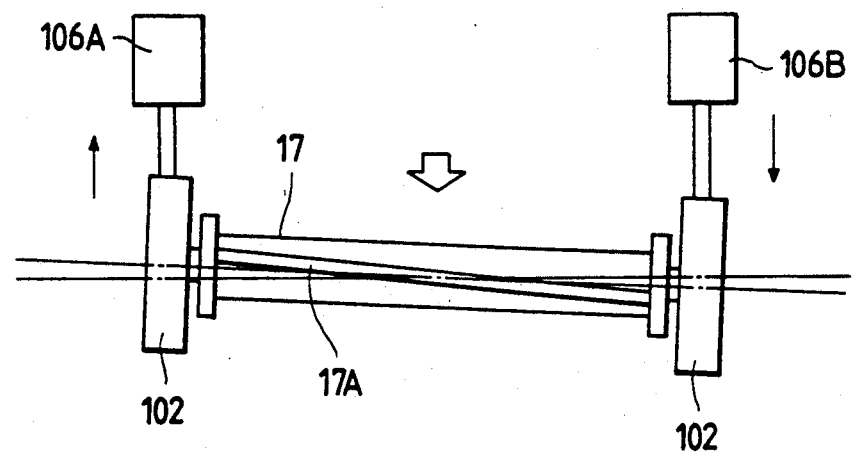
FIG. 9 is a view for explaining a means for setting the stationary and the rotary knives so that they extend obliquely at a prescribed angle to the direction of the feed of the film.

The cutoff of the laminated film 1B by the rotary cutter unit of the apparatus is briefly described from now on. Initially, the positioning engagement knobs 109 are manually removed from their locking positions for use of the rotary knife 17 of the rotary cutter. The rotary knife support member 16 is then pulled out forward so that the distance between the stationary and rotary knives 15 and 17 of the rotary cutter is increased. The leading edge portion of the film 1B, after being separated form the light-transmissible resin film 1A by the film separator 3, is then manually placed in front of the main vacuum suction plate 6, the film holding member 12 and the stationary knife 15 so that the film is sucked on the main vacuum suction plate and the film holding member. At that time, the leading edge portion of the film 1B is located slightly nearer the base plate conveyance passage I—I than the film holding member 12. The rotary knife support member 16 is then set in a position for the use of the rotary knife 17 of the rotary cutter. The positioning engagement knobs 109 are thereafter put in the locking positions so that the sliding members 105 are locked at the position. After that, the pneumatic cylinders 106A and 106B for adjusting the angle of the rotary cutter are driven in directions shown by arrows in FIG. 8, to set the rotary knife support member 16 so that the stationary and the rotary knives 15 and 17 extend perpendicularly across the direction of the feed of the laminated film 1B. In preparation for bonding the film 1B to the base plate 22 for the first time, a switch, which is for cutting off the leading edge portion of the film but not shown in the drawings, is operated to put the rotary cutter into action to cut off the film at the leading edge portion thereof, which is located nearer the base plate conveyance passage I—I than the film holding member 12. The film 1B is thus cut off at the leading edge portion thereof perpendicularly to the direction of the feed of the film. The pneumatic cylinders 106A and 106B for adjusting the angle of the rotary cutter and thereafter driven in directions shown by arrows in FIG. 9, so that the stationary and the rotary knives 15 and 17 are set at a prescribed oblique angle to the direction o the feed of the film 1B. A switch for permitting the sequential cutting of the film 1B after the above-mentioned first time cutoff of the leading edge portion thereof is then operated so that the film can be sequentially cut off. In this sequential manner, the rotary knife 17 is automatically rotated so that the film 1B is instantaneously sheared off by the operation of the stationary and the rotary knives 15 and 17. The laminated film 1B can thus be securely and quickly cut off.

To position and cut off the film 1B at the leading edge portion thereof before bonding the film to the base plate 22 for the first time, the rotary knife support member 16 can be easily pulled out forward by operating the engagement knobs 109 which are for positioning when the rotary knife 17 is in use, as described above. After the support member 16 is pulled out forward, it can be simply pushed in backward. In other words, the support member 16 can be easily set in a position for the use of the rotary knife 17, by the stoppers 110, the positioning adjustment screws 111 and the engagement knobs 109.

A method, which is another of the preferred embodiments and in which the laminated film 1B is automatically bonded to the base plate 22 under heat and pressure by the above-described apparatus, is described with reference to FIGS. 10, 11, 12, 13, 14, 15, 16, 17, 18 and 19. These drawings are schematic views of major parts of the apparatus. Since the continuous laminated film 1B needs to be first manually cut off at the leading edge portion thereof to have a new leading edge in a prescribed position, the positioning engagement knobs 109 are pulled out and the sliding members 105 for the rotary knife support member 16 are pulled in a direction shown by an arrow in FI. 10, so that the rotary cutter support member 16 (the rotary knife 17) is pulled out forward. Sufficient space is thus created to pass the film 1B. The film 1B is then laid through the space. After that, the rotary knife support member 16 is pushed into the position for the cutoff of the film 1B, and the sliding members 105 are securely locked by the positioning engagement knobs 109. A that time the rotary knife 17 is placed as shown in FIG. 11. After the rotary knife 17 is thus set, the switch for cutting off the film 1B at the leading edge portion thereof for the first time is operated to put the rotary cutter into action to cut off the unnecessary leading edge portion of the film perpendicularly to the direction of the feed thereof. At that time, the stationary knife support member 14 and rotary knife support member 16 of the rotary knife remain in horizontal positions as shown in FIG. 12. The film 1B subjected to the first manual cutoff described above is sucked at the leading edge portion thereof on the film holding member 12 so that the leading edge of ht film is located in front of the stationary knife 15, as shown in FIG. 13. When bonding the film 1B to the base plate 22 by the apparatus in an automatic operation is chosen and started, the stationary knife support member 14 and the rotary knife support member 16 are inclined by the angle adjusting pneumatic cylinders 106A and 106B so that the support members extend obliquely across the direction of the feed of the film.

When the base plate leading edge position detecting sensor of the base plate conveyance mechanism detects that the base plate 22 conveyed in the base plate conveyance passage I—I by the driving rollers 23A and idle rollers 23B of the conveyance mechanism has come to a prescribed position in the conveyance passage, the pneumatic cylinders 103A and 103B for moving the stationary knife 15 backward and forward are driven so that the film holding member 12 and the stationary knife are moved in an oblique direction shown by an arrow B in FIG. 14. As a result, the leading edge of the film 1B is moved away form the feed passage for the film and the film is sucked at the leading edge portion thereof on the leading end portion 6D of the main vacuum suction plate 6, as shown in FIG. 14. At that time, compressed air is blown from the air blowing pipes 19 and 20 in a direction shown by an arrow A, so that the film 1B is easily sucked onto the leading end portion 6D of the plate 6 and prevented from undergoing a wrinkle or the like. When the cut-off films 1B are thus automatically and sequentially bonded to the conveyed base plates 22, the leading edge of the film, defined after the film is cut off by the rotary cutter unit, is sucked on the leading end portion 6D of the main vacuum suction plate 6.

The leading edge of the base plate 22 conveyed in the conveyance passage I—I by the driving rollers 23A and idle rollers 23B of the base plate conveyance mechanism is stopped int eh film bonding position. For that stoppage, the leading edge of the base plate 22 is detected by the sensor provided at the conveyance mechanism, to cease the rotation of the driving rollers 23A on the basis of the detection signal sent out form the sensor.

The main vacuum suction plate 6 and the leading end portion 6D are moved, in a direction shown by an arrow C in FIG. 15, to the vicinity of the leading edge of the surface (film bonding surface) of the base plate 22 stopped in the film bonding position, so that the leading edge of the film 1B is fed to the position. The main vacuum suction plate 6 and the leading end portion 6D holding the film 1B by suction are then moved to the film bonding position so that the leading end portion is pushed onto the leading edge of the film bonding surface of the base plate 22 to bond the leading edge of the film to the base plate, as shown in FIG. 16. After that, the suction of the film 1B on the main vacuum suction plate 6 and the leading end portion 6D is ceased, and the plate and the end portion 6D are moved away form the film bonding position, as shown in FIG. 17. When the plate 6 moved away from the film bonding position has reached a position shown in FIG. 17, the support member 8 which supports the film holding member 12 and is integrally fitted with the plate 6 is moved to be located farther from the base plate conveyance passage I—I, so that the main vacuum suction plate and the film holding member are located farther from the base plate 22. At that time, however, the stationary knife support member 14 remains where it is. When the movement of the main vacuum suction plate 6 from the base plate 22 is completed so that the suction plate is located farthest from the base plate as shown in FIG. 18, the stationary knife support member 14 and the film holding member 12 are moved to the vicinity of the film 1B from behind, as shown in FIG. 17. At that time, the heat and pressure bonding roller 21 begins to be moved from a put-aside position to the film bonding position in a direction shown by an arrow D in FIG. 17. When the roller 21 is moved to the film bonding position, it comes into contact with the leading edge of the film 1B under appropriate pressure. After that, the roller 21 is rotated and the driving rollers 23A of the base plate conveyance mechanism are rotated again so that the base plate 22 is conveyed in a direction shown by an arrow E in FIG. 17, thus start bonding the film to the base plate under pressure. The rotation of the heat and pressure bonding roller 21 acts so that the film 1B is bonded by a prescribed length to the surface of the base plate 22 from the leading edge thereof to the trailing edge thereof while the film is automatically fed thereto. Since the heat and pressure bonding roller 21 is rotated so that the base plate 22 is conveyed in the above-mentioned direction while the film 1B is bonded to the base plate, the film is pulled out from the supply roller 2.

When a sensor, provided at the base plate conveyance passage I—I, detects that the trailing edge of the film 1B has come to a prescribed position at the base plate conveyance mechanism, a detection signal is sent out from the sensor. As a result, the main vacuum suction plate 6 and the film holding member 12 begin to be moved toward the base plate conveyance passage by a motor on the basis of the detection signal. The speed of the movement of the suction plate 6 and the holding member 12 becomes equal to that of the bonding of the film 1B. At an appropriate time, the suction plate 6 and the holding member 12 suck the film 1B on themselves, and the rotary knife 17 of the rotary cutter begins to be rotated from the original position thereof toward the passage for the film. The main vacuum suction plate 6 and the film holding member 12, which are holding the film 1B on themselves by the suction, approach the stationary knife support member 14 so that the cut-off of the film by the rotary cutter is completed when the distance between the film holding member and the stationary knife support member has become a prescribed very small value. The length of the film 1B from the blade of the stationary knife 15 to the boundary between the body and the curved region of the film leading edge portion of the main vacuum suction plate 6, at the time of the completion of the cut-off of the film, is equal to that of the length of the curved region. The length of the film 1B cut off by the rotary cutter, from the point of the pushing of the film by the heat and pressure bonding roller 21 to the trailing edge of the film, is substantially equal to that portion of the surface of the base plate 22 that does not have film bonded thereto.

The position of the trailing edge of the film 1B shown in FIG. 19 corresponds to the length of the base plate 22. After the cut off of the film 1B, the main vacuum suction plate 6 and the film holding member 12 are at a standstill as they remain holding the film on themselves by suction. The trailing edge of the film 1B cut off as described above is bonded to the trailing edge of the surface of the base plate 22 by the heat and pressure bonding roller 21. The film 1B is thus gradually bonded, under heat and pressure, to the base plate 22 from the leading edge thereof to the trailing edge thereof while the heat and pressure bonding roller 21 is rotated and the base plate is conveyed. Air is blown from the air blowing pipe 20 to the cut-off film 1B at the trailing edge portion thereof, in a direction shown by an arrow F in FIG. 19, and the film is sucked by the vacuum suction bar 25, so that the film passes by the bar, rubbing it. For that reason, appropriate tension is applied to the still unbonded portion of the film 1B so that the film does not undergo a wrinkle or the like when being bonded to the base plate 22.

When the trailing edge of the cut-off film 1B is bonded to that of the surface of the base plate 22 under heat and pressure, the heat and pressure bonding of the film to the base plate is completed. When the length of the still unbonded trailing edge portion of the film 1B has become very short immediately before the completion of the heat and pressure bonding thereof, the vacuum suction bar 25 is turned about the heat and pressure bonding roller 21 toward the base plate 22 so as to keep sucking the film on the bar until immediately before the completion of the heat and pressure bonding, to apply appropriate tension to the film to prevent it from undergoing a wrinkle or the like. The base plate 22 with the film 1B bonded thereto under heat and pressure as described above is conveyed, by the base plate conveyance mechanism, to an exposure unit provided next to the apparatus.

The vacuum suction bar 25 is thereafter turned back about the heat and pressure bonding roller 21 so that the bar goes away from the base plate conveyance passage I—I and is put into the original position thereof. The upper and the lower bonding rollers 21 are moved away from the base plate conveyance passage I—I so that the rollers go away from each other and are put aside from the film bonding position.

As described above, the leading edge portion of the film 1B is cut off perpendicularly to the direction of the feed thereof in preparation for bonding the film to the base plate 22 for the first time. The leading edge of the film 1B is sucked on the leading end portion 6D of the main vacuum suction plate 6 which is a film feed member. The plate 6 is moved to the vicinity of the leading edge of the film bonding surface of the base plate 22 conveyed to the film bonding position, so that the leading edge of the film 1B is brought to the base plate and bonded to that of the surface of the base plate in the film bonding position. The suction of the film 1B on the main vacuum suction plate 6 is then ceased. After that, the suction plate 6 is moved away from the film bonding surface of the base plate 22, and the film 1B is gradually bonded further, under heat and pressure, to the surface of the base plate by the heat and pressure bonding roller 21 while the film is continuously fed to the base plate by the roller. The film 1B is sucked while the speed of the conveyance of the base plate 22 and that of the movement of the main vacuum suction plate 6 are caused to correspond to each other. As a result, the film 1B does not droop when being cut off perpendicularly to the direction of the feed thereof by the rotary cutter so that the length of the cut-off film corresponds to that of the base plate 22. The trailing edge of the cut-off film is bonded to that of the surface of the base plate 22 by the heat and pressure bonding roller 21. A film 1B of large width can thus be quickly cut off perpendicularly to the direction of the feed thereof and then bonded to the base plate 22 while being prevented from drooping.

Cutting off the leading edge portion of the continuous film 1B for the first time is performed by the rotary cutter extending perpendicularly across the direction of the feed of the film, as the film is kept at a standstill. For that reason, the leading edge portion of the film 1B is cut off perpendicularly to the direction of the feed thereof. Thereafter cutting off the continuous film 1B to provide it with the trailing edge is performed by the rotary cutter inclined at the prescribed angle to the direction of the feed of the film depending on the speed of the feed of the film and that of the rotation of the rotary cutter. For that reason, film 1B is cut off perpendicularly to the direction of the feed thereof without droop, so that the length of the cut-off film corresponds to that of the base plate 22.

The rotary knife 17 of the rotary cutter is supported by the rotary knife support member 16 rotatably supported at both the ends thereof by the sliding members 105 which are for sliding the rotary knife support member and can be moved backward and forward relative to the film 1B. The stationary knife 15 of the rotary cutter is provided near the film holding member 12. Since the distance between the stationary knife 15 and the knife 17 can be made large in preparation for cutting off the continuous film 1B for the first time, it is easy to lay the film through the knives.

Not only is the film 1B quickly and securely cut off by the rotary cutter, but also an impact is prevented from being imparted to apparatus members at the cutter.

The present invention is not confined to the above-described embodiments, but may be embodied or practiced in other various ways without departing from the spirit or essential character thereof.

What is claimed is:

1. A method in which a continuous film is cut to a length which corresponds to that of a substrate, having a leading plate edge and being conveyed to a bonding position, said film being bonded to a film bonding surface of said substrate by a pressure bonding roller, said method comprising the steps of:
   cutting a portion of the continuous film to have a leading edge that is substantially perpendicular to the direction of the feed of said film by a rotary cutter while keeping said film stationary and orienting said cutter with its cutting line perpendicular to said film feed direction in preparation for an initial bonding of the film onto the substrate;
   bonding the leading edge of said continuous film to said bonding surface at the leading plate edge of said substrate;
   bonding said continuous film further, under pressure, to said film bonding surface gradually from the leading edge of said film by said pressure bonding roller while additional amounts of said continuous film are fed in said film feed direction;
   cutting said continuous film by said rotary cutter while said film is moving and orienting said cutter with its cutting line oriented obliquely across said film feed direction at a prescribed angle thereto depending on the speed of the feed of said film and the circumferential velocity of a rotary knife of said cutter, so that said cut-off film has a trailing edge and the length of said cut-off film corresponds to that of said substrate; and
   bonding said trailing edge of said cut-off film to that remaining portion of said film bonding surface of said substrate by said pressure bonding roller.

2. An apparatus by which a continuous film is cut to a length which corresponds to that of a substrate having a leading plate edge and being conveyed to a bonding position, and is bonded to the film bonding surface of said substrate, comprising;
   a body defining plural positions, including a film bonding position along a conveyance path;
   a substrate conveyance mechanism for conveying said substrate to the film bonding position and conveying said substrate out form said position along said conveyance path;
   a film feed member, which sucks the continuous film at the leading edge thereof onto itself an feeds said leading edge to said film bonding position;
   a support member, provided movably on said body of said apparatus and operative to support said feed member so that said support member and said feed member can be moved together;
   a film holding member, having a holding surface capable of being put in surface contact with said film a the leading edge thereof after the feeding of said film to said film bonding position by said feed member and comprising film suction means provided in said holding surface so as to such said film at the leading edge thereof onto said holding surface and oriented to hold said film onto said feed member, said film holding member being provided on said support member so that said film holding member can be moved toward one side of said film and moved away;
   a rotary cutter comprising a stationary knife and a rotary knife, said film holding member coupled to said stationary knife, said stationary knife and said film holding member being movable toward and away with respect to the rear side of said film, said rotary knife being attached to the body of said apparatus so that said rotary knife can be moved toward and away with respect to the outer side of said film;

a rotary cutter moving means for selectively placing each of said stationary and said rotary knife in a first position extended perpendicularly across said fed film and a second position extended obliquely across said feed film; and a pressure bonding roller operative to bond said film, from the leading edge thereof to the trailing edge thereof, to the film bonding surface of said substrate from the plate leading edge of said surface to the plate trailing edge thereof, after the leading edge of said film is held in said film bonding position by said feed member.

3. The apparatus according to claim 2, wherein length of the film cut off by the rotary cutter, from the point of the pushing of the film by the heat and pressure bonding roller to the trailing edge of the film, is substantially equal to that portion of the surface of the substrate that does not have film bonded thereto.

4. The apparatus according to claim 2, wherein length of the film from a blade of the stationary knife to a boundary between the body and a curved region of the film leading edge portion of the film feed member, at the time of the completion of the cut-off of the film, is equal to that of the length of the curved region.

5. The apparatus according to the claim 2, further comprising a rotary cutter support member attached to the body of said apparatus and sliding members, whereby said rotary knife of the rotary cutter is rotatably supported at both ends thereof by said sliding members which can be moved toward and away from the film, on rotary cutter support member; and the stationary knife of said cutter is provided proximate the film holding member.

6. The apparatus according to claim 5 wherein said stationary knife and said rotary knife are moveable in order to permit manual feeding of a leading edge of said continuous film therebetween in preparation for an automatic feed operation.

* * * * *